3,586,520
Patented June 22, 1971

3,586,520
REGENERATED CELLULOSE SPONGE RESISTANT TO PIGMENT BLEEDING AND FUNGICIDAL DEGRADATION AND PROCESS
Harold L. Dillon, Columbia, Tenn., assignor to E. I. du Pont de Nemours and Company, Wilmington, Del.
No Drawing. Continuation-in-part of application Ser. No. 619,155, Feb. 28, 1967. This application Mar. 28, 1969, Ser. No. 811,679
Int. Cl. C08b 27/74
U.S. Cl. 106—15
8 Claims

ABSTRACT OF THE DISCLOSURE

Regenerated cellulose sponges are immersed in a dispersion of a fungicidally active metal salt of dialkyl dithiocarbamic acid in water and then dried. A preferred embodiment uses a small amount of a zinc salt of 2-mercaptobenzothiazole in the dispersion. This treatment not only produces protection from fungicidal attack, but also reduces the tendency of the color pigment to leach out of the sponge when immersed in water.

CROSS REFERENCES TO RELATED APPLICATIONS

This is a continuation-in-part of my prior application, Ser. No. 619,155, filed Feb. 28, 1967.

BACKGROUND OF THE INVENTION

It is well known in the manufacture of artifical sponges made from regenerated cellulose to incorporate coloring matter, such as dyes, pigments, or the like, into the cellulose sponge-forming mix. Following manufacture, at least a portion of the pigment or other coloring matter has a tendency to bleed when wet with water or other liquid. This bleeding of the pigment or other coloring matter, particularly when the sponge is used while wet to clean light colored or uncolored fabrics and other stainable surfaces, is highly objectionable.

Typical methods for the manufacture of such sponges is described in Pfannenstiel and Johannes U.S. Pat. No. 1,909,629, issued May 16, 1933 and Craigue U.S. Pat. No. 2,133,810, issued Oct. 18, 1938. One approach to the problem of bleeding of coloring pigment from a wet sponge is described in Meador U.S. Pat. No. 3,057,745, issued Oct. 9, 1962.

The present invention provides a new and unobvious solution to the above-described problem.

SUMMARY OF THE INVENTION

According to the present invention, there is provided a pigmented cellulose sponge having excellent pigment bleed resistance which contains, as the agent which reduces the bleeding of the pigment, a fungicidally active metal salt of a dialkyl dithiocarbamic acid.

For some reason not fully understood, the incorporation in the pigmented cellulose sponge of the metal dialkyl dithiocarbamate effectively serves not only to protect the sponge from fungicidal degradation but also, surprisingly, the dithiocarbamate serves as a binding agent for the pigment particles to prevent their bleeding out of the sponge. This dual role performed by the dithiocarbamate renders unnecessary the incorporation of two separate and distinct additives to accomplish the two desired results.

DESCRIPTION OF THE PREFERRED EMBODIMENTS

Artificial sponges to which the present invention is directed are well known in the art and are described, for example, in the above mentioned Meador patent. That patent also identifies a large number of well known colorants for artificial sponges, representative of which can be mentioned pigment materials such as phthalocyanine organic, azo, chrome, iron oxide, naphthol and vat pigments.

The fungicidally active metal salts of dialkyl dithiocarbamic acids are well known. A method for their preparation is described, for example, in Tisdale and Williams U.S. Pat. No. 1,972,961, issued Sept. 11, 1934, reissued Apr. 30, 1946 as Reissue No. 22,750. The metal element in such salts can be any of those described in the above-mentioned patents. Particularly useful metals include zinc, lead, iron, magnesium, and the like but others can of course be used without departing from the concept of the present invention, including such metals as tin, cadmium, bismuth, cobalt, nickel, copper, silver, etc. Use of such metals as manganese may require the presence of a stabilizing material. The use of any metal which may have undesired toxicity will of course be avoided when the sponge is to be used under circumstances where toxicity may be a problem.

The amount of fungicidally active metal salt of dialkyl dithiocarbamic acid will ordinarily be at least about 0.05% by weight, based on the cellulose weight of the sponge. Usually, amounts below about 2% and preferably in the range from about 0.3 to 1.0% will provide very satisfactory results, when a balance of factors are considered including pigment bleeding resistance, preservative effectiveness, cost, etc. Ordinarily, amounts of less than about 5% by weight will be satisfactory and no reason is seen at the presnt time to exceed an amount of about 10%.

The alkyl groups on the dialkyl dithiocarbamic acid metal salt can be the same or different and are preferably those having less than 5 carbon atoms each. This invention includes, however, the use of dialkyl dithiocarbamates wherein each alkyl group has up to about eight carbons. Above this figure higher cost of course becomes a disadvantageous factor. The alkyl groups can be straight or branch-chained, representative of which can be mentioned dimethyl dithiocarbamates, diethyl dithiocarbamates, dipropyl dithiocarbamates, dibutyl dithiocarbamates, methyl ethyl dithiocarbamates, methyl propyl dithiocarbamates, methyl butyl dithiocarbamates, dihexyl dithiocarbamates, dioctyl dithiocarbamates, and the like. Such fungicidally active materials are well known to persons skilled in this art and no purpose would be served by setting forth an exhaustive list.

The artificial sponge products of this invention can be easily prepared by saturating the pigmented sponge with a liquid dispersion, preferably aqueous, of the metal dialkyl dithiocarbamate, followed by drying the sponge. This treatment serves effectively to introduce the preservative dithiocarbamate into the sponge while at the same time it effects a remarkable improvement in pigment binding which prevents or significantly reduces color bleeding. As suggested above, this result is surprising since the metal salts of dialkyl dithiocarbamic acids have not heretofore been known for their film-forming characteristics which generally describes the type of binding agent needed to prevent color bleeding.

Furthermore, the process just described for introducing the fungicidal metal salt into the artificial sponge, in a simple after treatment, differs radically from typical prior art methods of prevention of color bleeding in that the prior art methods involve mixing the film-forming binding material with the pigment before incorporating into the viscose mixture, as described in the above-mentioned Meador patent. The present method is advantageous in providing ease of control, product uniformity, and simplified procedures.

In an alternative method, a water-soluble organic or inorganic salt such as the sulfate, acetate, or the like, of a metal referred to above, can be reacted in aqueous solution with a water-soluble salt, such as the sodium salt, of the selected dialkyl dithiocarbamic acid, to precipitate in situ the desired fungicidally active metal dialkyl dithiocarbamate.

In the examples which follow, the sponges were produced in accordance with standard techniques. The blue sponges contained 0.15% by weight, based on the cellulose weight, of phthalocyanine blue pigment; the green sponges contained 0.18% of phthalocyanine green pigment; the pink sponges contained 0.21% of diazo red pigment; the yellow sponges contained 0.43% of benzidine yellow pigment.

Also in the following examples, the amount of fungicidal metal salt of dialkyl dithiocarbamic acid picked up by the sponge is expressed in terms of percent by weight based on the cellulose weight. Pigment bleeding tests were run on the treated sponges, and untreated sponges, using untreated sponges as controls. In these tests, the treated sponges and the controls were immersed for about 30 minutes in separate solutions of boiling water containing a small amount of wetting agent, squeezed while immersed, removed and dried. The resulting bleeding solutions were analyzed on a Model 9 Coleman Nepho-Colorimeter.

The following examples are set forth for purposes of illustration only and are not intended to be limiting.

EXAMPLE 1

The zinc salt of dimethyl dithiocarbamic acid (144 grams) was dispersed in 20 pounds of water. Blue, green, pink and yellow sponges were wet out in this dispersion, squeezed in a washing machine wringer and dried at 100° C. Pickup of the metal dialkyl dithiocarbamate on the sponge was approximately in the range from about 0.06–1.0%. Bleeding tests and analyses as described above showed a percent reduction in pigment bleeding as follows: blue sponge, 60.9%; green sponge, 31.0%; pink sponge, 68.0%; and yellow sponge, 70.2%. The resulting product has excellent resistance to pigment bleeding, rotting and funngicidal degradation.

EXAMPLE 2

The lead salt of dimethyl dithiocarbamic acid (144 grams) was dispersed in 20 pounds of water. Blue, green, pink and yellow sponges were wet out in this dispersion, squeezed in a washing machine wringer and dried at 100° C. Pickup of the metal dialkyl dithiocarbamate on the sponge was approximately 2%. Bleeding tests and analyses as described above showed a percent reduction in pigment bleeding as follows: blue sponge, 33.3%; green sponge, 13.0%; pink sponge, 35.7%, and yellow sponge, 30.0%. The resulting product has excellent pigment bleeding resistance and resistance to rotting and fungicidal degradation.

EXAMPLE 3

The zinc salt of dibutyl dithiocarbamic acid (144 grams) was dispersed in 20 pounds of water. Blue, green, pink and yellow sponges were wet out in this dispersion, squeezed in a washing machine wringer and dried at 100° C. Pickup of the metal dialkyl dithiocarbamate on the sponge was about 2%. Bleeding tests and analyses as described above showed a percent reduction in pigment bleeding as follows: blue sponge, 53.7%; green sponge, 30.0%; pink sponge, 62.5%; and yellow sponge, 31.8%. The resulting product has excellent pigment bleeding resistance and resistance to rotting and fungicidal degradation.

EXAMPLE 4

Examples 1, 2 and 3 can be repeated, using in the range from about 0.05% to 10% by weight of an aqueous dispersion containing about 46 parts by weight of the zinc salt of dimethyl dithiocarbamic acid and about 4 parts by weight of the zinc salt of 2-mercaptobenzothiazole, to obtain especially satisfactory results.

The foregoing examples can be repeated using other coloring agents and other metal salts of other dialkyl dithiocarbamic acids. Mixtures of such salts can also be used. The artificial sponge can also contain other additives such as fillers, reinforcing materials, etc., as will be readily understood. Particularly useful results are obtained when there is used along with the dialkyl dithiocarbamate a second fungicidally active compound which can be present in a synergistic amount. For example, a metal salt of 2-mercaptobenzothiazole, such as zinc 2-mercaptobenzothizole, can be advantageously used with the dialkyl dithiocarbamate, in a ratio of front about 1–90 parts by weight of the former to about 99–10 parts by weight of the latter.

The invention claimed is:

1. A porous sponge structure consisting essentially of regenerated cellulose,
   a pigment that is useful for coloration of said sponge structure and is normally susceptible to being leached out of said sponge structure when immersed in water and
   from about 0.05% to about 10% by weight, based on the cellulose weight, of fungicidally active metal salt of dialkyl dithiocarbamic acid,
      the metal element in said salts being selected from the group consisting of zinc, lead, iron, magnesium, tin, cadmium, bismuth, cobalt, nickel, copper and silver,
      said salt rendering the sponge structure resistant to fungicidal attack and causing the pigment to be resistant to being leached out of the sponge structure when immersed in water.

2. A sponge of claim 1 wherein said metal is selected from the group consisting of zinc, lead, magnesium and iron and each alkyl group in said dialkyl dithiocarbamic acid has 1 through 4 carbon atoms.

3. A sponge as in claim 1 wherein said metal salt of dialkyl dithiocarbamic acid is present in an amount in the range from about 0.1% to 2%.

4. A sponge as in claim 1 wherein said metal salt is zinc dimethyl dithiocarbamate.

5. A sponge as in claim 1 wherein said metal salt is lead dimethyl dithiocarbamate.

6. A sponge as in claim 1 wherein said metal salt is zinc dibutyl dithiocarbamate.

7. A porous sponge structure consisting essentially of regenerated cellulose, a pigment that is useful for coloration of said sponge structure and is normally susceptible to being leached out of said sponge structure when immersed in water, a fungicidally active metal salt of 2-mercaptobenzothizole, and from about 0.05% to about 10% by weight, based on the cellulose weight, of a fungicidally active metal salt of dialkyl dithiocarbamic acid, the metal element in said salts being selected from the group consisting of zinc, lead, iron, magnesium, tin, cadmium, bismuth, cobalt, nickel, copper and silver, said salts rendering the sponge structure resistance to fungicidal attack and causing the pigment to be resistant to being leached out of the sponge structure when immersed in water.

8. A process of rendering the pigment that is incorporated in a porous regenerated cellulose sponge structure resistant to being leached out of said sponge structure when immersed in water and rendering said porous regenerated cellulose sponge structure resistant to fungicidal attack, which comprises:

(1) saturating said sponge structure with a dispersion consisting essentially of water and a fungicidally active metal salt of a dialkyl dithiocarbamic acid the metal element in said salt being selected from the group consisting of zinc, lead, iron, magnesium, tin, cadmium, bismuth, cobalt, nickel, copper and silver and (2) drying said sponge structure, thereby causing said sponge structure to retain from about 0.05% to about 10% by weight, based on the cellulose weight, of the fungicidally active metal salt of a dialkyl dithiocarbamic acid.

References Cited

UNITED STATES PATENTS

| 2,060,733 | 11/1936 | Hunt et al. | 106—168 |
| 2,776,922 | 1/1957 | Somerville | 167—33 |
| 2,945,772 | 7/1960 | James | 106—122 |

OTHER REFERENCES

"Effect of Latex Compounds on the Dyeing of Spun Viscose Rayon Carpeting with Selected Fast To Light Direct Dies," an article appearing in the Dec. 31, 1956 issue of the American Dyestuff Reporter at pages P965–P971.

JULIUS FROME, Primary Examiner

J. H. MILLER, Assistant Examiner

U.S. Cl. X.R.

106—122, 194